April 22, 1930.  W. M. CHACE  1,755,425
METHOD OF WELDING MATERIALS OF DISSIMILAR THERMAL CHARACTERISTICS
Original Filed Sept. 14, 1927
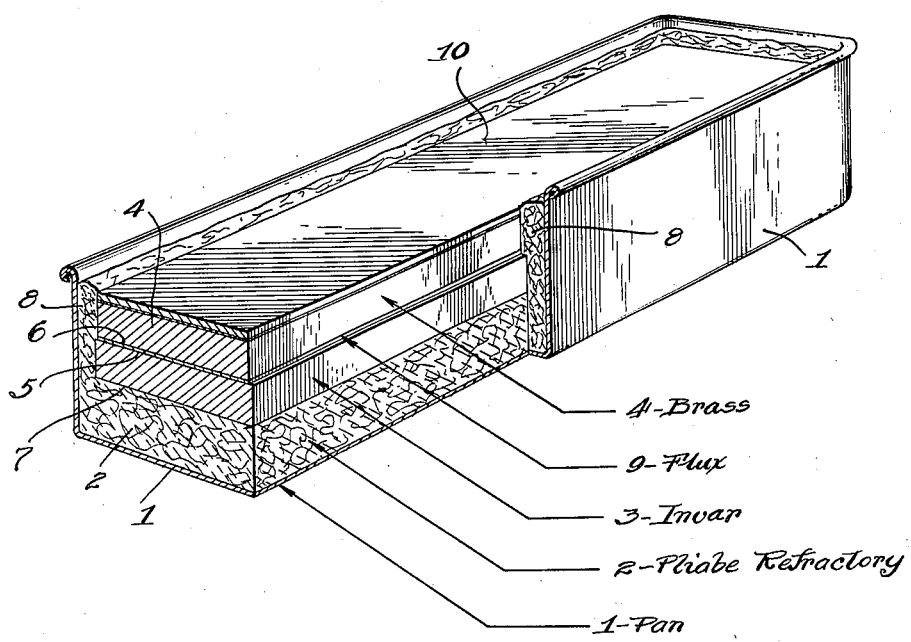
4-Brass
9-Flux
3-Invar
2-Pliabe Refractory
1-Pan
INVENTOR.
William M. Chace
BY
Charles E. Wisner
ATTORNEY.

Patented Apr. 22, 1930

1,755,425

UNITED STATES PATENT OFFICE

WILLIAM M. CHACE, OF DETROIT, MICHIGAN; ADELBERT H. LINDLEY, ARTHUR COOPER, AND HILMA B. CHACE, EXECUTORS OF SAID WILLIAM M. CHACE, DECEASED, ASSIGNORS TO W. M. CHACE VALVE COMPANY, OF DETROIT, MICHIGAN, A CORPORATION OF MICHIGAN

METHOD OF WELDING MATERIALS OF DISSIMILAR THERMAL CHARACTERISTICS

Application filed September 14, 1927, Serial No. 219,563. Renewed February 21, 1930.

This invention relates to a method of welding sheets or bars or brass or bronze and nickel steel alloy together, and the object of the invention is to provide a new and improved process by which such elements may be welded together to secure a uniform adherence of the two metals at the contacting surfaces.

The elements brass and nickel steel alloy, such as Invar are usually welded together to provide a bimetallic element for use in thermostats but in previous methods of welding scale, dirt and air or gas pockets accumulate or develop between the surfaces in contact resulting in a defective welding operation.

The object of the invention is to provide a process in which possibility of such detrimental effects is eliminated.

The following description is given relative to certain sizes of blocks of material to be welded and subsequently rolled to the desired thinness but as will be readily understood the invention is not limited to the size of the blocks or to the specific metals being welded inasmuch as two metals having different melting points may be welded together by this process.

The accompanying drawing is an illustration by means of which the various steps of the process will be readily understood.

In the welding of material for making bimetallic elements I utilize a steel pan 1 of about 13 gauge material and rectangular form being about 16½" by 6⅜" at the bottom and 16¾" by 6⅜" at the top and two inches in depth. In this pan I place a layer of about one inch in depth of a pliable refractory material such as the well known Armstrong's Dambabbitt 2. The term "Dambabbitt" is a trade term or a trade name used for a material pliable and refractory in nature and commonly used to provide a form or a wall at the ends of a bearing member for a shaft which is to be rebabbitted and, while this is the preferred material, any material sufficiently pliable and refractory in nature adapted to be used in a manner hereinafter described may be employed. The blocks of nickel steel 3 and of brass 4 are somewhat less in rectanglar dimensions than the pan and each block has one of its side faces, as 5 and 6 respectively tooled or shaped to take off the scale and to secure as flat a surface as is possible. This nickel steel preferably has its opposite face 7 sand blasted and is first placed in the pan being forced down into the Dambabbitt, shaped side 5 up to force a coat of about ¼" of Dambabbitt on all inside faces of the pan about the edges of the block as indicated at 8. The finished or shaped face 5 of the nickel steel is then covered with a thin coat of borax or other convenient flux indicated at 9. A sheet or block of brass 4 of the same dimensions is then placed on the flux with its shaped side 6 down directly over the nickel steel. On this brass plate is laid a second piece of brass 10 of about three by six by nine-tenths of an inch size for the size of pan above mentioned. The material thus assembled is then placed in a furnace until the temperature thereof is raised to about 1900° F., and the brass is thoroughly melted. Subsequent to the melting of the brass it is puddled with a preheated rake to remove the dirt and eliminate the gas pockets. The purpose of the additional amount of brass is to provide a carrier for the dirt which in the puddling operation is brought to the upper surface of the melted brass. Upon completion of the puddling operation the pan and material therein are immediately removed and allowed to cool while in the pan. After the welded material is cooled, the brass side is then shaped until the block is exactly one inch in thickness to correspond to the thickness of the nickel steel. Subsequent to this shaping operation the blocks will be perfectly flat and uniform as to thickness of the two elements and are ready for the rolling operation or other purpose for which the material is designed to be used.

By this process of welding it will be readily observable that there is a practically perfect weld between the two surfaces of the metals in contact in that the Dambabbitt, by reason of the pressing of the nickel steel element thereinto, is forced up around the sides of the pan preventing the melted brass from running down the edges of the nickel steel element as would be the case if some such material was not provided to hold the brass in its proper place.

It will also be evident from the foregoing description that the essential characteristics of the process in the welding of two metal elements of different melting points together is to place the metal of higher heat resistant quality in the bottom of the pan shielded by Dambabbitt or other material as mentioned, the use of the flux on the surface thereof as is commonly employed in the welding art, and the placing of the material of the lower heat resisting quality on the top and preferably in excess quantity to take care of the dirt and to enable the material to be puddled to eliminate gas and air pockets and in order that in the subsequent rolling operation in the manufacture of a bimetallic element the strips or sheet will have equal thickness of both materials. Subsequent to the welding of the material and after the cooling, the excess of material of the lower heat resistant quality may be removed by a cutting or shaping process so that the welded elements will both be of the same thickness. Naturally, if it be desired that in the final welded condition the metal of the lower heat resistant quality be greater in thickness than the other, the shaping operation can provide for such difference in thickness.

Having thus briefly described my invention what I claim and desire to secure by Letters Patent of the United States is—

1. The method of welding two metal pieces together of different heat resistant quality which consists in finishing a face of each part to provide a flat surface free from dirt or scale, placing the metal of the greatest heat resistant quality in a receptacle, shielding the untreated surfaces thereof with a pliable refractory material, coating the prepared surface with a flux, placing the material of lower heat resistant quality with its finished surface facing the flux covered surface of the first piece, then submitting the assembled pieces to a temperature sufficient to melt the material of the lower heat resistant quality, puddling the said metal of low heat resistant quality while in a melted state to coagulate the dirt and eliminate gas and air pockets, and allowing the metal to cool before removal from the receptacle.

2. The method of welding two metal pieces together of the same general outline and of different heat resistant quality which consists in finishing a face of each of the pieces to provide a flat surface free from dirt or scale, positioning the metal of the higher heat resistant quality with the finished surface uppermost, shielding the remaining faces thereof by means of a pliable refractory material, coating the said finished surface with a flux, placing the finished face of the piece of lower heat resistant quality over the finished face of the other metal substantially in registration therewith, submitting the pieces so arranged to a temperature sufficient to liquefy the material of lower heat resistant quality and raise the temperature of the other piece to welding heat, and finally allowing the metals to cool while in the receptacle.

3. The method of welding two metal pieces together of the same general outline and of different heat resisting quality which consists in finishing a corresponding face of each of the pieces to provide a flat surface free from dirt or scale, placing the metal of the higher heat resistant quality in a receptacle somewhat larger in size and of greater depth than the thickness thereof and with the finished surface uppermost, shielding the remaining surfaces of the said piece with a pliable refractory material, coating the finished surface of the said piece with a flux, placing the other piece with its finished surface on and substantially in registration with the finished surface of the said first piece, placing an additional piece of metal of the same low heat resistant quality on the said second piece, submitting the assembled pieces in the receptacle to a temperature sufficient to melt the metal of low heat resistant quality, puddling the same to coagulate the dirt and remove gas and air pockets, and allowing the same to cool while in the receptacle.

4. The method of welding a piece of brass and a piece of nickel steel alloy of the same general outline together to form a bimetallic element which consists in finishing a corresponding face of each piece to provide a flat surface free from dirt or scale, placing the nickel steel element with its finished surface uppermost in a receptacle containing a quantity of a pliable refractory material such as Dambabbitt in such manner as to force the babbitt upwardly about the side surfaces of the said piece, coating the finished surface thereof with a flux, placing the brass piece with its finished side downward on the flux covered surface of the first piece, then submitting the assembled pieces to a temperature sufficient to melt the brass, puddling the brass while at melting temperature to cogaulate the dirt and eliminate gas pockets, and allowing the same while in the receptacle to cool sufficiently to permit handling of the molded material without deformation.

In testimony whereof I sign this specification.

WILLIAM M. CHACE.